(12) United States Patent
Brengartner et al.

(10) Patent No.: US 11,073,458 B2
(45) Date of Patent: Jul. 27, 2021

(54) VIBRONIC SENSOR

(71) Applicant: Endress+Hauser SE+Co. KG, Maulburg (DE)

(72) Inventors: Tobias Brengartner, Emmendingen (DE); Manuel Sautermeister, Schopfheim (DE); Sascha D'Angelico, Rümmingen (DE)

(73) Assignee: Endress+HauserSE+Co. KG, Maulburg (DE)

( * ) Notice: Subject to any disclaimer, the term of this patent is extended or adjusted under 35 U.S.C. 154(b) by 167 days.

(21) Appl. No.: 16/317,677

(22) PCT Filed: Jun. 26, 2017

(86) PCT No.: PCT/EP2017/065647
§ 371 (c)(1),
(2) Date: Jan. 14, 2019

(87) PCT Pub. No.: WO2018/010941
PCT Pub. Date: Jan. 18, 2018

(65) Prior Publication Data
US 2019/0226900 A1 Jul. 25, 2019

(30) Foreign Application Priority Data
Jul. 12, 2016 (DE) .................. 10 2016 112 743.4

(51) Int. Cl.
*G01N 11/16* (2006.01)
*G01N 9/00* (2006.01)
*G01F 23/296* (2006.01)

(52) U.S. Cl.
CPC .......... *G01N 11/16* (2013.01); *G01F 23/2967* (2013.01); *G01N 9/002* (2013.01); *G01N 2009/006* (2013.01)

(58) Field of Classification Search
CPC .......... G01N 9/00; G01N 9/002; G01N 9/006; G01N 11/16
(Continued)

(56) References Cited

U.S. PATENT DOCUMENTS

| 4,499,765 A | 2/1985 | Benz et al. |
| 2002/0040592 A1* | 4/2002 | Getman .................. G01N 11/16 73/54.25 |

(Continued)

FOREIGN PATENT DOCUMENTS

| CN | 1468370 A | 1/2004 |
| CN | 102549399 A | 7/2012 |

(Continued)

OTHER PUBLICATIONS

Search Report for German Patent Application No. 10 2016 112 743.4, German Patent Office, dated Apr. 5, 2017, 9 pp.
(Continued)

*Primary Examiner* — Benjamin R Schmitt
(74) *Attorney, Agent, or Firm* — Christopher R. Powers; Endress+Hauser (USA) Holding Inc.

(57) ABSTRACT

The present disclosure relates to a method and corresponding sensor for determining density and/or viscosity of a medium using a vibronic sensor. An oscillatable unit is excited using an electrical excitation signal to execute mechanical oscillations, and the mechanical oscillations of the mechanically oscillatable unit are received and transduced into an electrical, received signal. The excitation signal is produced based on the received signal such that at least one predeterminable phase shift is present between the excitation signal and the received signal, wherein a frequency of the excitation signal is determined from the received signal at the predeterminable phase shift. A damping and/or a variable dependent on the damping are/is (Continued)

determined from the received signal at the predeterminable phase shift. From the damping and/or the variable dependent on the damping and from the frequency of the excitation signal, the density and/or the viscosity of the medium are/is ascertained.

15 Claims, 2 Drawing Sheets

(58) Field of Classification Search
USPC ..................................... 73/32 R, 32 A, 64.53
See application file for complete search history.

(56) References Cited

U.S. PATENT DOCUMENTS

| | | | |
|---|---|---|---|
| 2012/0279283 A1* | 11/2012 | Brengartner | G01F 23/2965 73/54.41 |
| 2013/0139576 A1 | 6/2013 | Goodbread et al. | |
| 2015/0000397 A1 | 1/2015 | Day | |
| 2015/0082873 A1 | 3/2015 | Goodbread | |

FOREIGN PATENT DOCUMENTS

| | | |
|---|---|---|
| CN | 102472728 A | 6/2013 |
| CN | 103608651 A | 2/2014 |
| DE | 10050299 A1 | 4/2002 |
| DE | 10057974 A1 | 5/2002 |
| DE | 102005015547 A1 | 10/2006 |
| DE | 102006033819 A1 | 1/2008 |
| DE | 102006034105 A1 | 1/2008 |
| DE | 102007013557 A1 | 2/2008 |
| DE | 102007043811 A1 | 3/2009 |
| DE | 102009026685 A1 | 12/2010 |
| DE | 102009028022 A1 | 2/2011 |
| DE | 102010030982 A1 | 1/2012 |
| DE | 102011075113 A1 | 11/2012 |
| DE | 102012113045 A1 | 6/2014 |
| DE | 102015101891 A1 | 8/2016 |
| DE | 102015102834 A1 | 9/2016 |
| WO | 9524630 | 9/1995 |
| WO | 2011038985 A1 | 4/2011 |

OTHER PUBLICATIONS

International Search Report for Patent Application No. PCT/EP2017/065647, WIPO, dated Sep. 22, 2017, 13 pp.

* cited by examiner

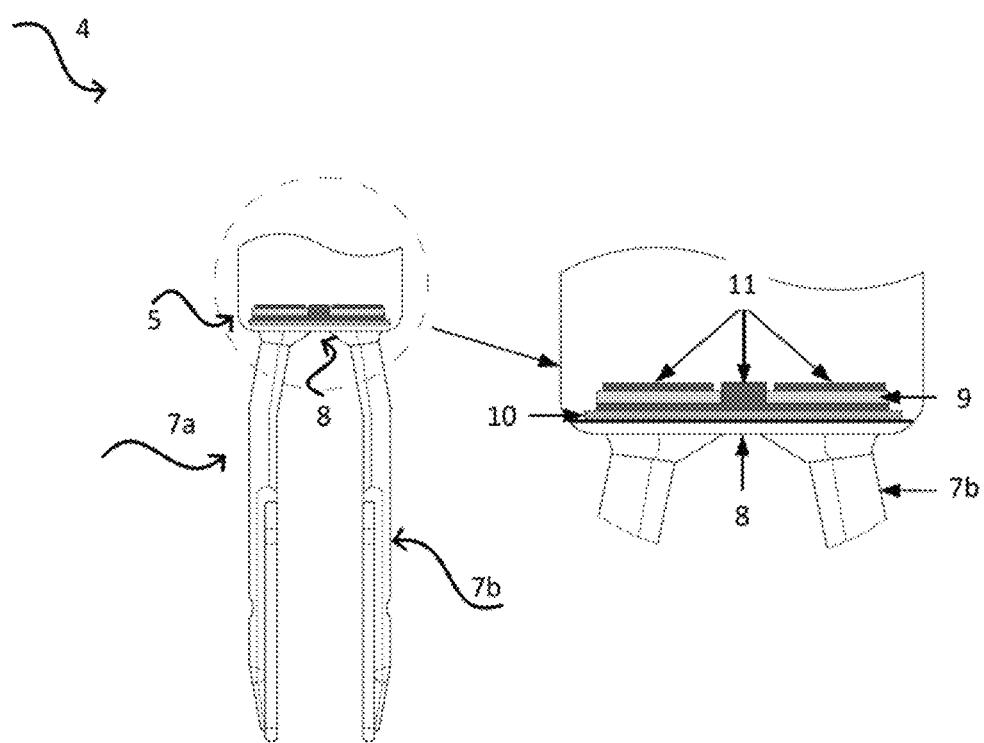
FIG. 2A     FIG. 2B

VIBRONIC SENSOR

CROSS-REFERENCE TO RELATED APPLICATIONS

The present application is related to and claims the priority benefit of German Patent Application No. 10 2016 112 743.4, filed on Jul. 12, 2016 and International Patent Application No. PCT/EP2017/065647, filed on Jun. 26, 2017 the entire contents of which are incorporated herein by reference.

TECHNICAL FIELD

The invention relates to a method for determining and/or monitoring the density and/or the viscosity of a medium in a containment by means of a vibronic sensor as well as to an apparatus suitable for performing the method.

BACKGROUND

Vibronic sensors find wide application in process and/or automation technology. In the case of fill-level measuring devices, such include at least one mechanically oscillatable unit, such as, for example, an oscillatory fork, a single tine or a membrane. This is excited during operation by means of a driving/receiving unit, frequently in the form of an electromechanical transducer unit, to execute mechanical oscillations. The driving/receiving unit can be, for example, a piezoelectric drive or an electromagnetic drive. The mechanically oscillatable unit can in the case of flow measuring devices, however, also be embodied as an oscillatable tube, which is flowed through by the medium, such as, for example, in a measuring device working according to the Coriolis principle.

Corresponding field devices are manufactured by the applicant in great variety and, in the case of fill-level measuring devices, sold, for example, under the marks, LIQUIPHANT and SOLIPHANT. The underpinning measuring principles are basically known from a large number of publications. The driving/receiving unit excites the mechanically oscillatable unit by means of an electrical excitation signal to execute mechanical oscillations. Conversely, the driving/receiving unit can receive the mechanical oscillations of the mechanically oscillatable unit and transduce them into an electrical, received signal. The driving/receiving unit can be either a separate driving unit and a separate receiving unit, or a combined driving/receiving unit.

The driving/receiving unit is, in many cases, part of a fed back, electrical, oscillatory circuit, by means of which the exciting of the mechanically oscillatable unit to execute mechanical oscillations occurs. For example, for a resonant oscillation, the oscillatory circuit condition must be fulfilled, according to which the amplification factor must be and all phases arising in the oscillatory circuit must sum to a multiple of 360°.

For exciting and fulfilling the oscillatory circuit condition, a certain phase shift between the excitation signal and the received signal must be assured. Therefore, frequently a predeterminable value for the phase shift, thus, a desired value for the phase shift between the excitation signal and the received signal, is set. For this, the most varied of solutions, both analog as well as also digital methods, are known. In principle, the setting of the phase shift can be effected, for example, through use of a suitable filter, or even be controlled by means of a control loop to a predeterminable phase shift, the desired value. Known from DE102006034105A1, for example, is the use of a tunable phase shifter. The additional integration of an amplifier with adjustable amplification factor for additional control of the oscillation amplitude, in contrast, is described in DE102007013557A1. DE102005015547A1 provides the application of an allpass filter. The setting of the phase shift is, moreover, possible using a so-called frequency sweep, such as, for example, disclosed in DE102009026685A1, DE102009028022A1, and DE102010030982A1. The phase shift can, however, also be controlled by means of a phase control loop (phase-locked loop, or PLL) to a predeterminable value. An excitation method based on this is subject matter of DE00102010030982A1.

Both the excitation signal as well as also the received signal are characterized by frequency $\omega$, amplitude A and/or phase $\phi$. Correspondingly, changes in these variables are usually taken into consideration for determining the particular process variable, such as, for example, a predetermined fill level of a medium in a container, or even the density and/or viscosity of a medium or the flow of a medium through a pipe. In the case of a vibronic limit level switch for liquids, it is, for example, distinguished, whether the oscillatable unit is covered by the liquid or is freely oscillating. These two states, the free state and the covered state, are, in such case, distinguished, for example, based on different resonance frequencies, thus, a frequency shift. The density and/or viscosity can, in turn, only be ascertained with such a measuring device, when the oscillatable unit is covered by the medium.

As described, for example, in DE10050299A1, the viscosity of a medium can be determined by means of a vibronic sensor based on the frequency-phase curve ($\phi$=g($\omega$)). This procedure is based on the dependence of the damping of the oscillatable unit on the viscosity of the medium. In such case, the lower the viscosity, the steeper the frequency-phase curve falls. In order to eliminate the influence of the density on the measuring, the viscosity is determined based on a frequency change caused by two different values of the phase, thus, by means of a relative measurement. In this regard, either two different phase values can be set and the associated frequency change determined, or a predetermined frequency band is moved through and the frequencies detected at which at least two predetermined phase values are achieved.

Known from DE102007043811A1, moreover, is to ascertain a change of the viscosity from a change of eigenfrequency and/or resonant frequency and/or phase position and/or to determine the viscosity from correspondedly stored dependencies of the oscillations of the oscillatable unit on the viscosity of the medium. Also in the case of this procedure, the dependence of the determining of viscosity on the density of the medium must be taken into consideration.

Known from DE10057974A1 for determining and/or monitoring the density of a medium are a method as well as an apparatus, by means of which the influence of at least one disturbing variable, for example, the viscosity, on the oscillation frequency of the mechanically oscillatable unit is ascertained and correspondingly compensated. Furthermore, described In DE102006033819A1 is setting a predeterminable phase shift between the excitation signal and the received signal, in the case of which effects from changes of the viscosity of the medium on the mechanical oscillations of the mechanically oscillatable unit are negligible. In such case, the density is determined essentially by the formula $$\rho_{Med} = \frac{1}{K} \left[ \left( \frac{f_{0,Vak} + C \cdot t + A \cdot t^2}{f_{T,P,Med}} \right)^2 (1 + D \cdot p) - 1 \right]$$

wherein K is the density sensitivity of the mechanically oscillatable unit, $f_{0,vak}$ the frequency of the mechanical oscillations in vacuum, C and A the linear and quadratic temperature coefficients of the mechanically oscillatable unit, t the process temperature, $f_{0,med}$ the frequency of the mechanical oscillations in the medium, D the pressure coefficient, and p the pressure of the medium.

Because of the empirical assumption that the measuring for a determined predeterminable phase shift is independent of the viscosity, basic limitations result. After a certain viscosity, the described measuring principles can no longer assure exact measuring of the density. Thus, for each medium, a maximum allowable viscosity must be determined, up to which the density determination can be performed. In order to avoid this problem, known from the previously unpublished German patent application No. 102015102834.4 are a vibronic sensor as well as a method for its operation, by means of which the density and/or the viscosity are determinable in an expanded application domain. The analytical measuring principle proposed there takes into consideration the interactions between the oscillatable unit and the medium. The sensor is operated at two different predeterminable phase shifts and from the response signal the process variables, density and/or viscosity, are/is ascertained. The German patent application No. 102015102834.4 (US2018031460) is incorporated herein by reference.

SUMMARY

Starting from the state of the art, an object of the present invention is to expand the application domain for determining the density and/or viscosity by means of a vibronic sensor.

This object is achieved by the features of the method claim 1 as well as by the features of the apparatus claim 8.

Regarding the method, the object is achieved by a method for determining and/or monitoring density and/or viscosity of a medium in a containment by means of a vibronic sensor. An oscillatable unit is excited by means of an electrical excitation signal to execute mechanical oscillations, and the mechanical oscillations of the mechanically oscillatable unit are received and transduced into an electrical, received signal. The excitation signal is produced starting from the received signal in such a manner that at least one predeterminable phase shift is present between the excitation signal and the received signal, wherein a frequency of the excitation signal is determined from the received signal at the predeterminable phase shift. According to the invention, furthermore, a damping and/or a variable dependent on the damping are/is determined from the received signal at the predeterminable phase shift, and at least from the damping and/or the variable dependent on the damping, and from the frequency of the excitation signal, the density and/or the viscosity of the medium are/is ascertained. The method is applicable when a single predeterminable phase shift between the excitation signal and the received signal is set. It is, however, likewise suitable in the case of two or a number of predeterminable phase shifts. Especially, a first and a second phase shift can be set alternately in predeterminable time intervals.

The damping D, also referred to as degree of damping, measure of damping or Lehr's measure of damping, describes generally the behavior an oscillatable system after an excitation. It is usually a dimensionless variable, which, in principle, gives an indication of the energy loss of the oscillatable system. A variable very closely related to the damping is the quality Q of an oscillatable system, also referred to as the quality factor, Q-factor or resonance sharpness. A high quality Q corresponds, for example, to a weak damping D. A determining of the density and/or viscosity based on the quality Q, which is connected with the damping D via a mathematical relation, falls thus, for example, likewise under the scope of protection of the present invention. It is to be noted that both damping as well as also quality are generally known variables for those skilled in the field of mechanical oscillations, so that the various formulas and relationships do not need to be explored here.

The method of the invention offers the advantage that it relies on an analytical approach for determining the density and/or viscosity of a medium by means of a vibronic sensor. It is, in such case, an especially simply implementable measuring principle. In contrast, the method described in German patent application No. 102015102834.4 involving setting two different phase shifts is no longer absolutely necessary. The method of the invention as well as the corresponding sensor are universally applicable independently of the viscosity of the medium. This holds especially for highly viscous media, in which the oscillatable unit can still just execute an oscillatory movement. Besides the simplifications and the extension of the field of application to various media, the solution of the invention is distinguished, furthermore, by a high accuracy relative to the determining of the process variables, density and/or viscosity.

In an advantageous embodiment, essentially +/−90° is selected as the predeterminable phase shift. In general, a phase shift between the excitation signal and received signal is preferably set, which leads to a resonant oscillation of the oscillatable unit, especially in the fundamental oscillation mode. A purely mechanical oscillator, for example, executes resonant mechanical oscillations at a phase shift of −90°. Depending on type of driving/receiving unit and/or the construction and choice of components of the electronics unit, in given cases, other supplementally caused phase shifts must likewise be taken into consideration. In the case of the LIQUIPHANT instrument sold by the applicant, for example, an additional phase shift of +180° is produced, so that the phase shift between excitation signal and received signal is usually set at +90° for a resonant oscillation. For other embodiments of a vibronic sensor, also phase shifts of, for example, +/−45° or 0° between the excitation signal and received signal can be advantageous.

The driving/receiving unit can comprise, for example, a piezoelectric element. Alternatively, the driving/receiving unit is an electromagnetic or a magnetostrictive driving/receiving unit.

An especially preferred embodiment of the method of the invention provides that a predeterminable change of the density and/or viscosity of the medium is monitored.

Another especially preferred embodiment of the method provides that a predetermined fill level or limit-level of the medium in the container is determined and/or monitored.

According to the invention, a vibronic sensor switching according to determinable limit values for density and/or viscosity of a medium, thus a limit level switch, can be implemented. For example, dividing layers, or boundary layers, between two different media arranged on top of one another or different states of a medium arranged on top of one another, e.g. in the case of foam formation, can be monitored in situ. A detection of dividing layers or limit levels becomes advantageously possible according to the invention and in contrast to other methods of determining the density and/or viscosity from the state of the art due to the comparatively high velocity in the determining of the particular process variable.

An embodiment of the method of the invention provides that at least one reference damping and/or a variable dependent on reference damping is determined for the case, in which the oscillatable unit is excited by means of an electrical excitation signal to execute mechanical oscillations in the at least partially, preferably completely, immersed state in a reference medium, or in the absence of a medium. The reference medium is preferably a medium of known density and viscosity. In the case of a mechanical oscillation in the absence of a medium, such can be both an oscillation of the mechanically oscillatable unit in air as well as also in vacuum.

The mechanical oscillations of the mechanically oscillatable unit in the immersed state in a reference medium or in the absence of a medium are then received and transduced into an electrical, received signal. In such case, the excitation signal is preferably produced starting from the received signal in such a manner that a predeterminable phase shift is present between the excitation signal and the received signal, wherein from the received signal at the predeterminable phase shift a reference-frequency of the excitation signal is determined. Moreover, the reference damping is determinable from the received signal at the predeterminable phase shift.

Advantageously, for determining the density and/or the viscosity, a mathematical model with at least one equation of motion for an oscillatory movement of the oscillatable unit is taken into consideration, for which equation of motion the interaction of the oscillatable unit with the medium is taken into consideration in the form of a compressive force and a frictional force, which arise from the medium surrounding the oscillatable unit, as well as a frictional force, which arises as a result of an equally formed movement of the oscillatable unit within the medium. Thus, for determining density and/or viscosity, the interactions between the oscillatable unit and the respective medium as well as the interactive influencing of the two variables, density and viscosity, are taken into consideration. Due to the goal of obtaining an analytical solution of the equation of motion, the oscillatory movement, which really is a bending oscillation, is approximated with a rotary oscillation. Furthermore, serving as approximation of the geometry of the oscillatable unit for each of the two fork tines are two elliptical cylinders of different dimensions. It is to be noted, however, that also other geometries can be selected for the oscillatable unit without limiting the generality of the approach. In such case, however, the geometric coefficients must be correspondingly adapted.

An especially preferred embodiment of the present invention provides that the damping and/or the reference damping and/or the variable dependent on the damping and/or reference damping are/is determined
- based on a slope of a phase of the received signal at the frequency and/or reference frequency of the excitation signal at the predeterminable phase shift,
- based on the amplitude of the received signal as a function of time after a turning off of the excitation signal, and/or
- based on a modulation of the excitation signal.

Known from DE10050299A1, for example, is to calculate the viscosity of a medium based on the slope of the phase between excitation signal and received signal. A variant of the method of the invention provides, in contrast, ascertaining the damping, and/or a variable dependent thereon, from the slope of the phase at the frequency of the excitation signal at the predeterminable phase shift.

A measuring of the amplitude of the received signal as a function of time after a turning off of the excitation signal, thus, the decay behavior of the oscillations of the mechanically oscillatable unit, is known from DE102007043811A1. According to the invention, the damping or a variable dependent on the damping is determined from the decay behavior and then, based on the damping, the density and/or viscosity is determined.

For ascertaining the damping based on a modulation of the excitation signal, in turn, reference is made to the previously unpublished German patent application No. 102015101891.8. In the case of such method for determining and/or ascertaining the damping, it is advantageously sufficient to set only a single predeterminable phase shift between the excitation signal and received signal, which corresponds to an exciting of the sensor at a single frequency.

In connection with determining and/or ascertaining the damping or the variable dependent on the damping, all three documents are incorporated here by reference.

It is to be noted here that besides these three options for determining the damping and/or at least a variable dependent thereon, other methods can be used, which also fall within the scope of the present invention. An advantage of ascertaining the damping for determining density and/or viscosity is that with the help of damping according to the invention, analytical determination of density and/or viscosity become(s) possible.

Preferably, the oscillatable unit for determining the density and/or viscosity is arranged in a defined position within the container in such a manner that it extends to a determinable penetration depth, especially completely, into the medium.

Regarding the apparatus, the object of the invention is achieved by an apparatus for determining and/or monitoring at least a first process variable of a medium in a containment, comprising an electronics unit and an oscillatable unit, wherein the electronics unit is embodied to execute at least one embodiment of the method of the invention.

Advantageously, the electronics unit includes a memory unit. Stored in such memory unit can be, for example, the reference damping, the reference frequency or even other constants and/or parameters.

In a preferred embodiment of the apparatus, the electronics unit is embodied to supply the oscillatable unit with an excitation signal, which is composed of an excitation carrier signal with an excitation carrier frequency and an excitation modulation signal with an excitation modulation frequency, and to receive from the oscillatable unit a received signal, which is composed of a received carrier signal and a received modulation signal. Furthermore, the electronics unit is embodied to determine at least the damping D and/or the reference damping Do from the phase shift between the excitation modulation signal and the received modulation signal and/or at least from the received carrier signal.

Advantageously, the mechanically oscillatable unit is an oscillatory fork, a single tine, or a membrane.

The forms of embodiment in connection with the apparatus of the invention are applicable mutatis mutandis also for the method of the invention and vice versa.

In summary, the following advantages result from the present invention compared to the state of the art:
- density can be ascertained independently of the viscosity of the medium,
- viscosity can be ascertained independently of the density of the medium, and
- for determining density and/or viscosity, it can be sufficient to set a single phase shift between excitation signal and received signal,
- the analytical formulas of the invention for density and/or viscosity are more exact than the formulas known from the state of the art, and
- the speed, with which a determining of density and/or viscosity can be made, is significantly increased in comparison with methods known from the state of the art.

BRIEF DESCRIPTION OF THE DRAWINGS

The invention as well as advantageous embodiments thereof will now be described in greater detail based on the appended drawing, the figures of which show as follow:

FIG. 2A shows a schematic drawing of an oscillatory fork; and

FIG. 2B shows a detail view of the oscillatory fork of FIG. 2A.

DETAILED DESCRIPTION

Figure 1:
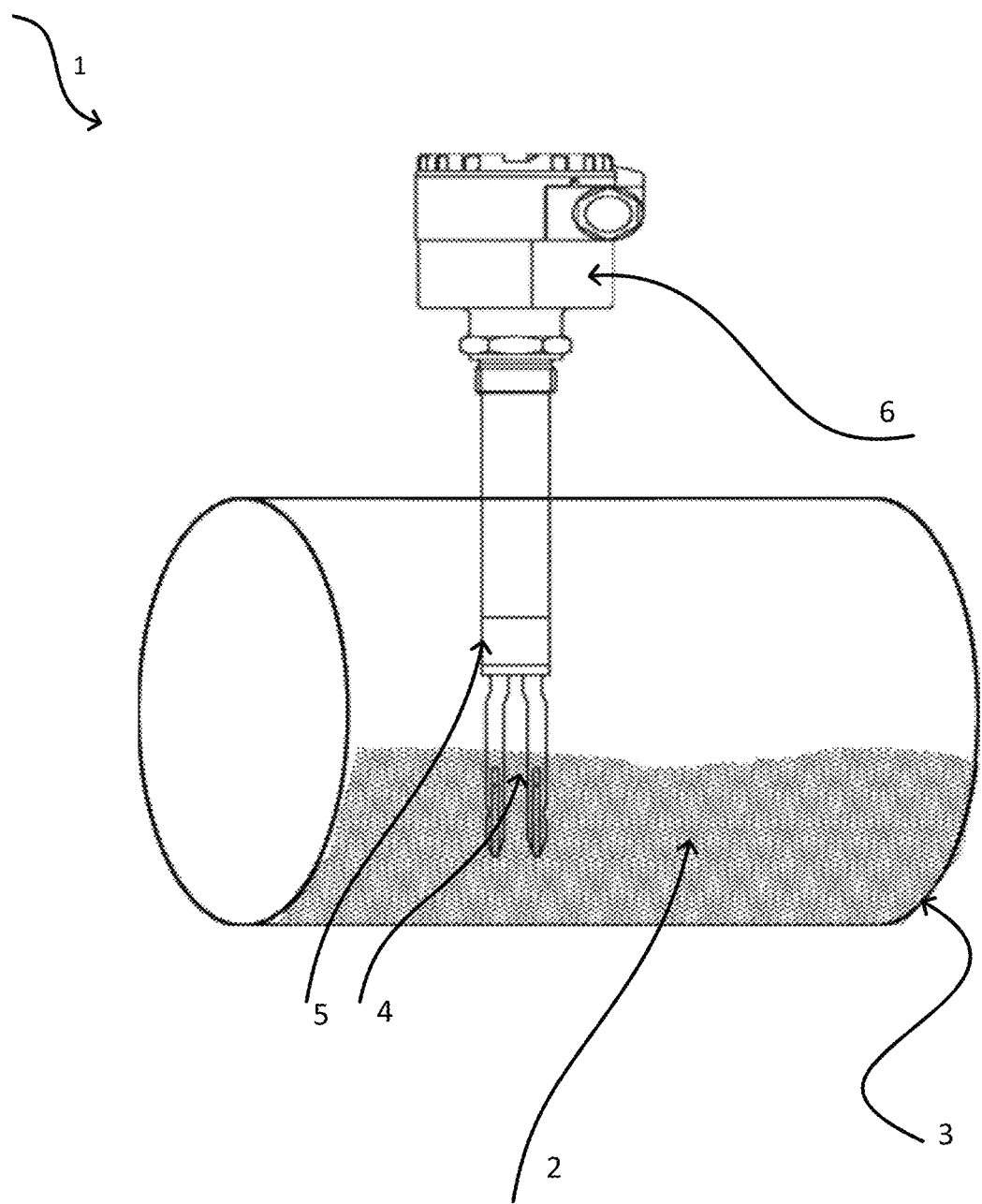
FIG. 1 shows a schematic view of a vibronic sensor of the state of the art.

FIG. 1 shows a vibronic sensor 1, including an oscillatable unit 4 in the form of an oscillatory fork, which extends partially into a medium 2, which is located in a container 3. The oscillatable unit is excited by means of the exciter/receiving unit 5, for example, a piezoelectric stack- or bimorph drive, to execute mechanical oscillations. It is understood, however, that also other embodiments of a vibronic sensor fall within the scope of the invention. Further provided is an electronics unit 6, by means of which signal registration,—evaluation and/or—feeding occurs.

FIG. 2A shows an oscillatable unit 4 in the form of an oscillatory fork, such as is integrated, for example, into the vibronic sensor 1 sold by the applicant under the LIQUIPHANT mark. The oscillatory fork 4 comprises two oscillatory tines $7a,7b$, fork tines, connected to a membrane 8. In order to cause the oscillatory tines $7a,7b$ to execute mechanical oscillations, a force is exerted on the membrane 8 by means of a driving/receiving unit 5 mounted by material bonding on the side of the membrane 8 facing away from the oscillatory tines $7a,7b$. The driving/receiving unit 5 is an electromechanical transducer unit, and includes, for example, a piezoelectric element 9, or even an electromagnetic drive. Either the driving unit and the receiving unit are provided as two separate units, or else as a combined driving/receiving unit. FIG. 2B details the driving/receiving unit 5. A piezoelectric element 9 is arranged on a steatite disk 10 and equipped with electrodes 11 for applying the excitation signal as well as for accepting the received signal.

In the case, in which the driving/receiving unit 5 comprises a piezoelectric element 9, the force exerted on the membrane 8 is generated by applying an excitation signal $U_E$, for example, in the form of an electrical, alternating voltage. A change of the applied electrical voltage effects a change of the geometric shape of the driving/receiving unit 5, thus, contraction and relaxations within the piezoelectric element 9, in such a manner that the applying an electrical alternating voltage as excitation signal $U_E$ brings about an oscillation of the membrane 8 connected by material bonding with the driving/receiving unit 5.

As indicated above, a goal of the present invention is to expand the application domain for determining density and/or viscosity by means of a vibronic sensor 1. The analytical model of the invention applied for describing the oscillatory movements of a vibronic sensor 1 corresponds in large part to that described in the previously unpublished German patent application No. 102015102834.4, which is incorporated herein by reference. Therefore, the complete derivation of the analytical model is not repeated here.

The following explanations refer, without limiting the generality of the approach, to a resonant oscillation with a phase shift of $\Delta\varphi=90°$ between the excitation signal $U_E$ and the received signal $U_R$ and a reference frequency $\omega_0$, which corresponds to an undamped oscillation of the oscillatable unit 4 in vacuum. The deliberations can, in such case, in each case, when required, be applied to other cases (other phase shift $\Delta\varphi$, reference medium 2, instead of an undamped oscillation in vacuum).

According to the invention, a ratio can be formed between the reference frequency $\omega_0$ and the frequency $\omega$ of the excitation signal $U_E$ of the oscillatable unit 4 at the predeterminable phase shift $\Delta\varphi$. In this way, there results $$\frac{\omega_0^2}{\omega_{90}^2} = 1 + a_1\sqrt{\frac{\rho\eta}{\omega_{90}}} + a_2\rho$$

In such case, $\rho$ is the density and $\eta$ the viscosity of the medium, while the coefficients $\alpha_1$ and $a_2$ are geometric sensor constants.

If, furthermore, the damping $D_0$ of the sensor in vacuum is correlated with the damping $D_{90}$ of the vibronic sensor in the medium, there results $$\frac{D_{90}\omega_0}{D_0\omega_{90}} = 1 + a_3\sqrt{\rho\eta\omega_{90}} + a_4\eta + a_5$$

wherein $\alpha_3$-$\alpha_5$ are likewise geometric sensor constants.

The density can then be calculated based on following formula:

$$\rho = \frac{A}{C} - \frac{B\left(AE + BD - BG - \sqrt{\begin{array}{c}A^2E^2 - 2ABDE + 2ABEG + 4CFAD - \\ 4CFAG + B^2D^2 - 2B^2DG + B^2G^2\end{array}}\right)}{C(2BE - 2CF)}$$

For the viscosity, the following formula holds:

$$\eta = \frac{\left(AE^2 - E\sqrt{\begin{array}{c}A^2E^2 - 2ABDE + 2ABEG + 4CFAD + \\ 4CFAG + B^2D^2 - 2B^2DG + B^2G^2 + \\ F(2CD - 2CG) - BDE + BEG\end{array}}\right)}{2CF^2 - 2BEF}$$

The capital letters in the formulas are defined as follows:

$$A = \frac{\omega_0^2}{\omega_{90}^2} - 1$$

$$B = \frac{a_1}{\sqrt{\omega_{90}}}$$

$$C = a_2$$

$$D = \frac{D_{90}\omega_0}{D_0\omega_{90}} - 1$$

$$E = a_3\sqrt{\omega_{90}}$$

$$F = a_4$$

$$G = a_5$$

For determining the density ρ and/or the viscosity η of a medium 2, thus, steps of the invention are executed as follows:

Before start-up of the vibronic sensor:
1. determining the variables $\omega_0$ and $D_0$, in each case, in vacuum, and
2. determining, especially experimentally, the geometric sensor constants $\alpha_1$-$\alpha_5$ in a suitable number of selectable test media of known density ρ and viscosity η.

During operation of the vibronic sensor:
3. Continual measuring/determining of $\omega_{90}$ and $D_{90}$, and
4. Continual calculating of the density ρ and the viscosity η.

For determining and/or ascertaining the damping $D_{90}$ of the vibronic sensor 1 according to the invention, a number of different options are available. For example, the damping $D_{90}$ of the vibronic sensor 1 can be ascertained at the predeterminable phase shift $\Delta\varphi=90°$ between the excitation signal $U_E$ and the received signal $U_R$ based on the slope of the phase $$\frac{d\varphi}{d\omega}$$

at the frequency $\omega_{90}$. In such case, $$\left.\frac{d\varphi}{d\omega}\right|_{\omega=\omega_{90}} = \frac{1}{D_{90}\omega_{90}}$$

and therewith $$D_{90} = \frac{1}{\left.\frac{d\varphi}{d\omega}\right|_{\omega=\omega_{90}} \cdot \omega_{90}}$$

The invention claimed is:

1. A method for determining and/or monitoring a density and/or a viscosity of a medium in a containment using a vibronic sensor, the method comprising:
exciting a mechanically oscillatable unit to execute mechanical oscillations using an electrical excitation signal;
receiving and transducing the mechanical oscillations into an electrical received signal, wherein the excitation signal is generated based on the received signal such that there is a single, predetermined phase shift between the excitation signal and the received signal;
determining a frequency of the excitation signal from the received signal at the predetermined phase shift;
determining a damping and/or a variable dependent on the damping from the received signal at the predetermined phase shift; and
analytically ascertaining the density and/or viscosity of the medium based on the frequency of the excitation signal and the damping and/or the variable dependent on the damping,
wherein the damping and/or the variable dependent on the damping is/are determined based on:
a slope of a phase of the received signal at the frequency and/or a reference frequency of the excitation signal at the predetermined phase shift;
an amplitude of the received signal as a function of time after interrupting the excitation signal; and/or
a modulation of the excitation signal.

2. The method of claim 1, wherein the predetermined phase shift is +/−90°.

3. The method of claim 1, wherein a predeterminable change of the density and/or viscosity of the medium is monitored.

4. The method of claim 1, wherein a predetermined fill level or a limit-level of the medium in the containment or a limit-level between a first and a second medium is monitored.

5. The method of claim 1, further comprising determining at least one reference damping and/or a variable dependent on the at least one reference damping, wherein the oscillatable unit is excited by the electrical excitation signal to execute mechanical oscillations in absence of the medium or in an at least partially immersed state in a reference medium.

6. The method of claim 1, wherein the reference damping and/or the variable dependent on the reference damping is/are determined based on:
a slope of a phase of the received signal at the frequency and/or a reference frequency of the excitation signal at the predetermined phase shift;
an amplitude of the received signal as a function of time after interrupting the excitation signal; and/or
a modulation of the excitation signal.

7. The method of claim 1, wherein ascertaining the density and/or viscosity of the medium includes using an equation of motion for an oscillatory movement of the oscillatable unit based at least partially on an interaction of the oscillatable unit with the medium including a compressive force, a first frictional force, which arise from the medium surrounding the oscillatable unit, and a second frictional force, which arises from an equally formed movement of the oscillatable unit within the medium.

8. The method of claim 1, wherein the mechanically oscillatable unit is an oscillatory fork, a single tine or a membrane.

9. An apparatus for determining and/or monitoring a process variable of a medium in a containment, the apparatus comprising:
an oscillatable unit; and
an electronics unit configured to:
excite the mechanically oscillatable unit to execute mechanical oscillations using an electrical excitation signal;
receive an electrical received signal transduced from the mechanical oscillations, wherein the excitation signal is generated based on the received signal such that there is a single, predetermined phase shift between the excitation signal and the received signal;

determine a frequency of the excitation signal from the received signal at the predetermined phase shift;

determine a damping and/or a variable dependent on the damping from the received signal at the predetermined phase shift; and ascertain the density and/or viscosity of the medium analytically based on the frequency of the excitation signal and the damping and/or the variable dependent on the damping, wherein the damping and/or the variable dependent on the damping is/are determined based on:

a slope of a phase of the received signal at the frequency and/or a reference frequency of the excitation signal at the predetermined phase shift;

an amplitude of the received signal as a function of time after interrupting the excitation signal; and/or a modulation of the excitation signal.

10. The apparatus of claim 9, wherein the electronics unit includes a memory unit.

11. The apparatus of claim 9, wherein the electronics unit is further configured to:

supply the oscillatable unit with the excitation signal, composed of an excitation carrier signal with an excitation carrier frequency and an excitation modulation signal with an excitation modulation frequency;

receive from the oscillatable unit the received signal, composed of a received carrier signal and a received modulation signal; and determine at least the damping and/or a reference damping from a phase shift between the excitation modulation signal and the received modulation signal and/or at least from the received carrier signal.

12. The apparatus of claim 11, wherein the reference damping and/or a variable dependent on the at least one reference damping is determined by exciting the oscillatable unit to execute mechanical oscillations in absence of the medium or in an at least partially immersed state in a reference medium.

13. The apparatus of claim 9, wherein the electronics unit is further configured to ascertain the density and/or viscosity of the medium using an equation of motion for an oscillatory movement of the oscillatable unit based at least partially on an interaction of the oscillatable unit with the medium including a compressive force, a first frictional force, which arise from the medium surrounding the oscillatable unit, and a second frictional force, which arises from an equally formed movement of the oscillatable unit within the medium.

14. The apparatus of claim 9, wherein the predetermined phase shift is +/−90°.

15. The apparatus of claim 9, wherein the mechanically oscillatable unit is an oscillatory fork, a single tine or a membrane.

* * * * *